United States Patent
Cheynet De Beaupre et al.

(10) Patent No.: US 10,400,804 B2
(45) Date of Patent: Sep. 3, 2019

(54) DEVICE FOR THE SHOCK-ABSORBING ATTACHMENT OF TWO ELEMENTS TO BE ASSEMBLED, METHOD FOR PRODUCING SUCH A DEVICE, SET OF TWO ELEMENTS ASSEMBLED USING SUCH A DEVICE, AND ASSEMBLY METHOD

(71) Applicant: AIRBUS DEFENCE AND SPACE SAS, Les Mureaux (FR)

(72) Inventors: Rene Jean Cheynet De Beaupre, Castanet Tolosan (FR); Patrick Camarasa, Rebigue (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 127 days.

(21) Appl. No.: 15/537,232

(22) PCT Filed: Nov. 24, 2015

(86) PCT No.: PCT/FR2015/053192
§ 371 (c)(1),
(2) Date: Jun. 16, 2017

(87) PCT Pub. No.: WO2016/102792
PCT Pub. Date: Jun. 30, 2016

(65) Prior Publication Data
US 2018/0266461 A1 Sep. 20, 2018

(30) Foreign Application Priority Data

Dec. 24, 2014 (FR) ...................................... 14 63334

(51) Int. Cl.
*F16B 11/00* (2006.01)
*F16B 5/01* (2006.01)
(Continued)

(52) U.S. Cl.
CPC .............. *F16B 5/01* (2013.01); *F16B 11/006* (2013.01); *F16B 5/0241* (2013.01); *F16B 11/008* (2013.01); *F16F 15/08* (2013.01)

(58) Field of Classification Search
CPC ........ F16B 11/006; F16B 11/008; F16F 15/08
(Continued)

(56) References Cited

U.S. PATENT DOCUMENTS 2,074,340 A * 3/1937 Piron ....................... B61F 3/04
 105/199.3
3,975,007 A * 8/1976 Chorkey ................ B60G 15/08
 267/152
(Continued)

FOREIGN PATENT DOCUMENTS

JP 2000 145889 A 5/2000

OTHER PUBLICATIONS

International Search Report, dated Feb. 11, 2016, from corresponding PCT/FR2015/053192 application.

*Primary Examiner* — Flemming Saether
(74) *Attorney, Agent, or Firm* — Young & Thompson

(57) ABSTRACT

A device for the shock-absorbing attachment of two elements to be assembled, the attachment device including: an inner part that is tubular along an attachment axis; an outer part that is tubular along the attachment axis, and hollow, the inner part being accommodated in the outer part such that the outer surface of the inner part is facing the inner surface of the outer part; an elastomer layer between the outer part and the inner part, the elastomer layer, when seen in section in a longitudinal plane including the attachment axis, including: to either side of the attachment axis, at least three so-called longitudinal portions, and at least two so-called transverse portions.

20 Claims, 8 Drawing Sheets

(51) Int. Cl.
*F16F 15/08* (2006.01)
*F16B 5/02* (2006.01)

(58) Field of Classification Search
USPC ............... 411/82, 82.1; 248/638; 16/2.1, 2.5
See application file for complete search history.

(56) References Cited

U.S. PATENT DOCUMENTS

| | | | | |
|---|---|---|---|---|
| 4,922,573 | A | * 5/1990 | Miller | B23B 49/023 156/92 |
| 4,973,208 | A | 11/1990 | Gauron | |
| 5,551,661 | A | * 9/1996 | Bunker | B60K 17/00 248/634 |
| 5,876,024 | A | * 3/1999 | Hain | B64C 1/18 244/119 |
| 6,601,818 | B1 | * 8/2003 | Larsen | A47C 3/0255 248/158 |
| 7,234,693 | B2 | * 6/2007 | Schnaars | F16F 1/3863 267/140.11 |
| 7,249,756 | B1 | 7/2007 | Wilke et al. | |
| 2003/0079311 | A1 | * 5/2003 | Yamamoto | B60G 99/004 16/2.1 |

* cited by examiner

DEVICE FOR THE SHOCK-ABSORBING ATTACHMENT OF TWO ELEMENTS TO BE ASSEMBLED, METHOD FOR PRODUCING SUCH A DEVICE, SET OF TWO ELEMENTS ASSEMBLED USING SUCH A DEVICE, AND ASSEMBLY METHOD

The present invention relates to a device for the shock-absorbing attachment of two elements to be assembled together, intended to isolate the elements from each other in order to limit the transmission of impacts and/or vibrations. The present invention has a particular application in the field of satellites and spacecraft.

In a known manner, a satellite comprises a body forming a load-bearing structure on which are attached various items of equipment and instruments. By way of example, items of platform equipment (propellant tanks, batteries, telemetry/command antennas) or payload equipment (measuring instruments, telecommunication antennas) may be mentioned.

The items of equipment and instruments are for the most part sensitive to impacts and vibrations. For a satellite, impacts and vibrations can occur in particular when the satellite is launched and when the satellite is in operation in orbit.

In fact, in order to launch the satellite, the latter is placed on a launcher, to which it is attached in a detachable manner. During the take-off phase, on the flight path, then during the staging of the launcher, events produce impacts and vibrations. The impacts and the vibrations of the launcher are transmitted to the satellite, then to the instruments and to the items of equipment by propagating in the load-bearing structure. These impacts and vibrations, having high amplitude and low frequencies, risk disturbing or even damaging the instruments and items of equipment. Moreover, when the satellite is in orbit, impacts and vibrations, generally having lower amplitudes but higher frequencies, also occur, for example when items of equipment and instruments are deployed or when thrusters are initiated. These impacts and vibrations also propagate in the load-bearing structure of the satellite to the instruments and items of equipment.

It is worthwhile and sometimes necessary to install means for absorbing the impacts and vibrations and preventing their transmission between two elements to be assembled. This makes it possible to minimize the overdimensioning of the structures and items of equipment or to increase the pointing accuracy of a payload.

The problems of impacts and vibrations can be overcome in several ways, for example:

By overdimensioning the elements to be assembled, but this solution comes with an increase in mass and in costs.

By installing isolation modules as an interface between the part to be isolated and a part propagating vibrations. For example, such modules are found between a satellite interface ring of the launcher and a launcher interface ring of the satellite. Document U.S. Pat. No. 7,249,756 gives an example of such a module, comprising parts made from elastomers for absorbing the impacts and vibrations and metallic parts for ensuring the stiffness of the module. However, such modules increase the space requirement by being accommodated in a space between the two interface rings. They are therefore unsuitable for mounting instruments and items of equipment on the body of the satellite, where the space requirement is problematical. They also add weight to the assembly. As an additional part to be handled, they also make mounting more complex.

By using devices for shock-absorbing attachment, called inserts, integrated with one of the elements to be assembled, so as to reduce the space requirement. Document JP 2000-145889 describes an example of such an attachment device for assembling a load on a honeycomb plate. The attachment device comprises a lower part forming a housing for an insert body, the inner walls of the housing being covered by bodies of viscoelastic material. The lower part is co-cured with the honeycomb plate. Then, the insert body is placed in the housing, and an upper part closes the housing. The insert body partially emerges from the housing so that the load can be attached thereon by bolting. During relative movements between the load and the honeycomb plate, the insertion body abuts against inner walls of the housing, over the bodies made from viscoelastic material providing shock-absorption for the impacts and vibrations. This type of isolation device has a reduced space requirement, the load being in contact with the honeycomb plate without the interposition of a part. However, installing the attachment device onto the load and onto the honeycomb plate by means of such a structure proves difficult. Moreover, the stiffness of the isolation means depends, among other things, on the surface area of the body made from viscoelastic material, so that the stiffness is limited by the dimensions of the housing formed by the lower part.

Therefore, the need exists for a new shock-absorbing attachment device making it possible for the abovementioned drawbacks to be overcome.

Thus, a first subject of the invention is to propose a shock-absorbing attachment device which is easy to install and does not require approval for a new installation technique.

A second subject of the invention is to propose a shock-absorbing attachment device which does not increase the space requirement on the satellite.

A third subject of the invention is to propose a shock-absorbing attachment device making it possible to have characteristics, such as stiffness, which can be adapted according to need.

A fourth subject of the invention is to propose a shock-absorbing attachment device which does not require any particular modification of the existing equipment.

A fifth subject of the invention is to propose a shock-absorbing attachment device which does not increase the mass or the costs of integration.

According to a first aspect, the invention proposes a device for the shock-absorbing attachment of two elements to be assembled. The attachment device comprises in particular:

an inner part that is tubular along an axis of attachment, intended to be rigidly attached to a first element to be assembled, and comprising an outer lateral surface;

an outer part that is tubular along the axis of attachment, and is hollow, intended to be rigidly attached to the second element to be assembled and comprising an inner lateral surface, the inner part being accommodated in the outer part so that the outer surface of the inner part is facing the inner surface of the outer part;

an elastomer layer between the outer part and the inner part.

The outer lateral surface of the inner part comprises at least one irregular portion and the inner lateral surface of the external part comprises at least one irregular portion which is complementary to the irregular portion of the outer surface of the inner part. Furthermore, the elastomer layer comprises a first face bonded to the irregular portion of the outer lateral surface of the inner part, and a second face, opposite the first face, bonded to the irregular portion of the inner lateral surface of the external part. The elastomer layer, when viewed in cross-section in a longitudinal plane comprising the axis of attachment, comprises:

- on each side of the axis of attachment, at least three so-called longitudinal portions, distributed in the direction of the axis of attachment in a predetermined pitch, at least one of the three longitudinal portions working against the other two portions in the direction of the longitudinal axis and
- at least two so-called transverse portions, working in a direction that is transverse to the axis of attachment, a first portion being situated on a first side of the axis of attachment and the second portion being situated on the other side of the axis of attachment.

The device thus forms a shock-absorbing insert, in particular for mounting items of equipment on the body of a satellite, or also for providing the interface between a satellite and its launcher, the shock-absorbing characteristics of which can be easily adapted according to need. In fact, as the elastomer layer is located over irregularities of the lateral surfaces of the inner and outer parts, the geometry of the elastomer layer can be modified without modifying the overall geometry of the insert. In particular, the number, the pitch and the dimensions of the longitudinal portions and the transverse portions can be adapted.

According to an embodiment, the irregular portion of the outer surface of the inner part and the irregular portion of the inner surface of the outer part comprise rings around the longitudinal direction. The elastomer layer bonded to these rings thus forms the longitudinal and transverse portions. By adapting the geometry of the rings, the geometry of the elastomer layer is also adapted. For example, the rings can be substantially perpendicular to the longitudinal direction and rectangular in shape.

According to another embodiment, the irregular portion of the outer surface of the inner part comprises at least one thread around the longitudinal direction, and the irregular portion of the inner surface of the outer part comprises at least one thread complementary to the thread of the inner part, the elastomer layer at least partially covering the threads. Thus, by adapting the geometry of the threads, the geometry of the elastomer layer and thereby the characteristics of the device are advantageously adapted according to need. The threaded form also enables the assembly of the inner part into the outer part to be facilitated by allowing screwing. The threads can have multiple shapes. Rectangular or triangular threads can be mentioned. In this latter case, the transverse portions and the longitudinal portions of the elastomer layer are merged.

Preferably, the inner part and the outer part are metal parts. Their physical properties are such that they provide good mechanical behaviour for the envisaged applications, in particular in aeronautics. Moreover, the inner and outer parts can be obtained by casting, or by 3D printing.

When the device is inactive, the thickness of the elastomer layer, between its two faces, is preferably constant, so that the internal part is centred in the outer part, allowing greater control of performance.

According to an embodiment, the elastomer layer is continuous in the longitudinal direction and around the longitudinal direction, so that the elastomer layer has the form of a single one-piece elastomer part. The elastomer layer thereby provides shock-absorption regardless of the direction of stress.

The inner part can comprise a hole, for example tapped, in order to allow its simple assembly to the first element by using screwing.

According to a second aspect, the invention proposes a method for producing the shock-absorbing attachment device as described above, comprising the following stages:

producing a blank of the device comprising a blank of the inner part on which an outer surface is formed and a blank of the outer part on which an inner surface is formed, the inner surface of the blank of the outer part facing the outer surface of the blank of the inner part;

inserting an elastomer between the outer surface of the blank of the inner part and the inner surface of the blank of the outer part;

bonding the elastomer on the one hand onto the outer surface of the blank of the inner part and on the other hand onto the inner surface of the blank of the outer part.

The stage of inserting the elastomer is for example an injection stage.

According to a first embodiment of the method, producing the blank of the device comprises the following operations:

machining the blank of the inner part, the outer surface forming a male thread, machining the blank of the outer part, the inner surface forming a female thread complementary to the male thread, screwing the blank of the inner part into the blank of the outer part in order to obtain the blank of the device.

According to a second embodiment of the method, producing the blank of the device comprises the following operations:

simultaneous three-dimensional printing of the blank of the outer part and of the blank of the inner part in position in the blank of the outer part, producing at least one bridge between the blank of the outer part and the blank of the inner part ensuring their relative position is held.

Lastly, the method preferably comprises a final stage of machining the blank to the desired final dimensions of the device.

According to a third aspect, the invention proposes a set comprising at least two elements assembled by means of at least one device as described above, the outer part being rigidly attached to a first element, the inner part being rigidly attached onto the second element.

When the inner part comprises a hole, the second element is rigidly attached to the inner part via a screw passing through the hole.

In a first example, the first element is a load-bearing structure, such as the body of a satellite and the second element is an item of equipment of the satellite.

In a second example, the first element is a launcher interface ring and the second element is a satellite interface ring.

According to a fourth aspect, the invention proposes an assembly method for a support set as described above, comprising a stage of rigid attachment of the outer part of the attachment device onto the first element and a stage of rigid attachment of the second element onto the inner part of the attachment device.

Other advantages will become apparent in the light of the description of particular embodiments of the invention accompanied by the figures, in which:

FIG. 4b is a detail view of FIG. 4a;

FIG. 5b is a detailed view of FIG. 5a;

FIG. 6b is a detail view of FIG. 6a;

Figure 11A:
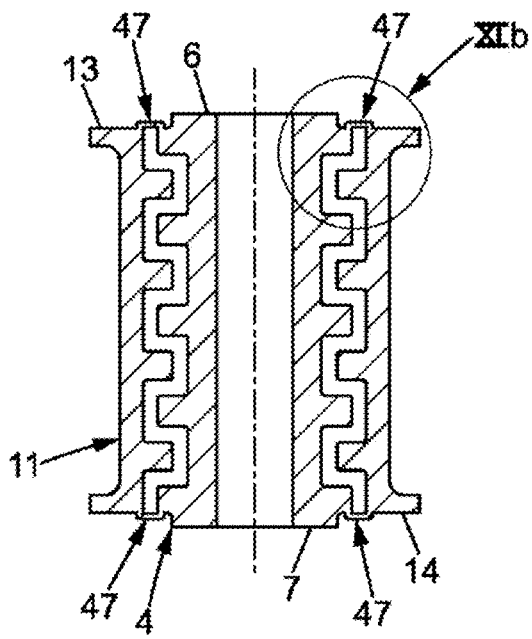
Figure 11B:
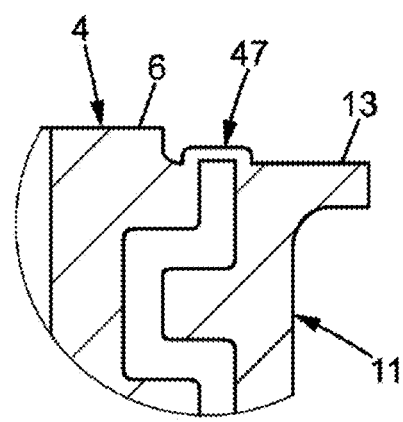

FIGS. 9a to 9e each represent a stage of a first embodiment of a method for producing the shock-absorbing attachment device;

FIGS. 10a to 10d each represent a stage of a second embodiment of a method for producing the shock-absorbing attachment device;

FIG. 11a is a longitudinal cross-section view of the shock-absorbing attachment device obtained according to a variant of the second embodiment of the method of production;

FIG. 11b is a detailed view of FIG. 11a.

Figure 1:
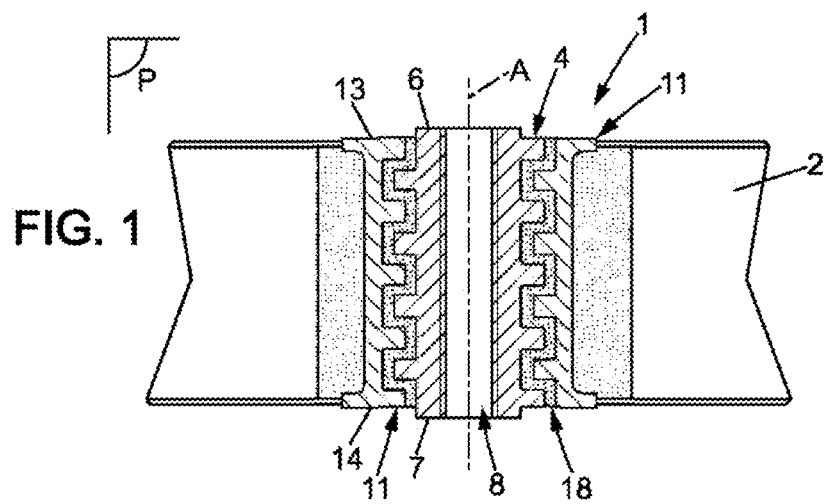
FIG. 1 is a longitudinal cross-section view of a first embodiment of a shock-absorbing attachment device accommodated in a first element of the plate type.
Figure 2:
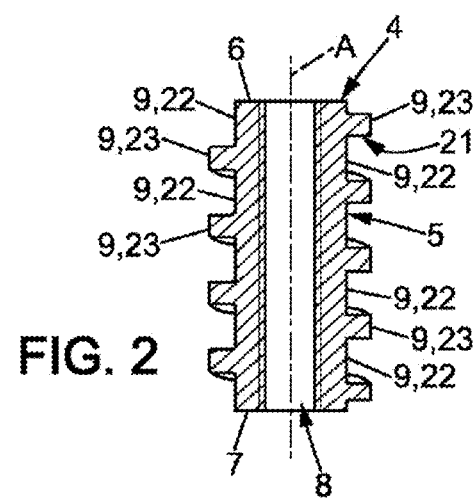
FIG. 2 is a longitudinal cross-section view of an outer part of the device of FIG. 1.
Figure 3:
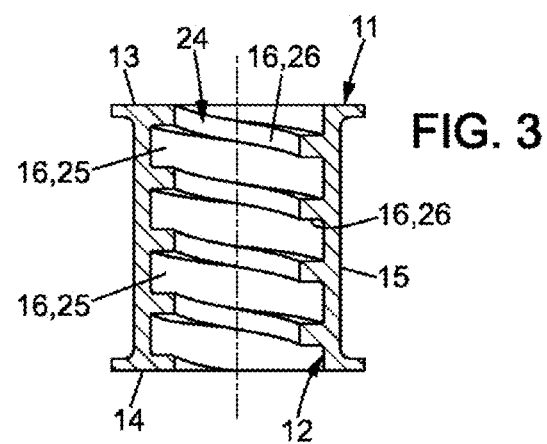
FIG. 3 is a longitudinal cross-section view of an inner part of the device of FIG. 1.

In FIG. 1, a shock-absorbing attachment device 1 intended to ensure both attachment and filtering of vibrations between two elements, in particular of a satellite is shown in its entirety. For example, a first element 2 is a load-bearing structure, such as a body, of the satellite, generating vibrations, and the second element 3 is an item of equipment, or a set of items of equipment and instruments of the satellite to be isolated from the vibrations. Only the load-bearing structure 2 is partially shown in FIG. 1. For example, it is a panel having a honeycomb structure. Such an attachment device 1 is also called an insert. Such an insert makes it possible to not substantially add weight or increase the space requirement, as it is accommodated in one of the elements to be assembled.

The device 1 for shock-absorbing attachment comprises an inner part 4, having a generally tubular form about axis of attachment A. The inner part 4 has an outer lateral surface 5, and extends longitudinally between two substantially flat transverse surfaces 6, 7 which are substantially flat. It is preferably metallic.

Hereinafter, the adjective "longitudinal" and its variants denote a direction parallel to the axis of attachment A; the adjective "transverse" and its variants denote any direction comprised in a plane perpendicular to the axis of attachment A.

The term "outer" should be understood as describing that which is at a distance from, or turned in the opposite direction to, the axis of attachment A, while the term "inner" should be understood, conversely, as describing that which is near to or turned towards the axis of attachment A.

A first transverse surface 6 of the inner part 4 is called upper, and is intended to be in contact against the item of satellite equipment 3 to be attached. The second transverse surface 7 is then called the lower surface. The adjectives "upper" and "lower" are used here for the purposes of simplifying the description with reference to the natural orientation of the figures, and should not be interpreted as implying any structural limitation whatsoever.

The inner part 4 also has a hole 8 that has rotational symmetry about the axis of attachment A which, as will be explained below, is advantageously tapped.

The outer wall 5 is irregular over at least one portion, i.e. in a longitudinal plane P comprising the axis of attachment A it has at least one relief 9.

By "relief" is meant here a hollow followed by a projection, i.e. a recess on the outer surface 5 towards the axis of attachment A, followed in the direction of the axis of attachment A by a protrusion on the outer surface 5 moving away from the axis of attachment A. Each relief then forms in the direction of the axis of attachment A at least three portions of the outer surface 5, at least one of the portions being oriented along the axis of attachment A in a direction opposite to the other two. More precisely, for each relief of the outer surface 5, a first portion oriented along the axis of attachment A in a first direction, a second portion oriented in a second direction opposite to the first and a third portion oriented in the first direction are successively defined in the direction of the axis of attachment A.

The attachment device 1 also comprises an outer part 11, with a generally tubular form, also about axis of attachment A. The outer part 11 has an inner lateral surface 12. The outer part 11 also extends between two transverse surfaces 13, 14, namely a first surface 13, called upper, capable of being in contact with the item of equipment 2 of the satellite and a second surface 14, called lower. The outer part 11 also has an outer lateral surface 15 which, as will be explained below, serves as an interface for attaching onto the satellite panel 3. It is also preferably metallic.

The diameter of the inner lateral surface 12 of the outer part 11 is greater than the diameter of the inner lateral surface 5 of the inner part 4, so that the inner part 4 can be accommodated in the outer part 11, the outer lateral surface 5 of the inner part 4 facing the inner lateral surface 12 of the outer part 11. More precisely, the inner lateral surface 12 of the outer part 11 also comprises at least one irregular portion, complementary to the irregular portion having an outer lateral surface 5 of the inner part 4, so that the inner part 4 can be accommodated in the outer part 11, the outer lateral surface 5 of the inner part 4 facing the inner lateral surface 12 of the outer part 11. More precisely, in a longitudinal plane P comprising the axis of attachment A, the outer part 11 comprises at least one relief 16 complementary to the relief 9 of the inner part 4, also extending through 360° about the axis of attachment A. More precisely, when the relief 9 of the inner part 4, in the longitudinal direction, is a hollow followed by a projection, then the relief 16 of the outer part 11 is a projection, i.e. it forms a protrusion on the inner lateral wall 12 towards the axis of attachment A, followed by a hollow, i.e. it forms on the inner lateral surface 12 a recess opposite to the axis of attachment A; conversely, when the relief 9 of the inner part is a projection followed by a hollow, the relief 16 of the outer part 11 is a hollow followed by a projection. Moreover, the relief 9 of the inner part 4 and the relief 16 of the outer part 11 are dimensioned so that one can accommodate the other.

The dimensions of the inner part 4 and of the outer part 11 are such that a space is formed between the outer lateral surface 5 of the inner part 4 and the inner lateral surface 12 of the outer part 11. This space need not have constant dimensions, even when the device 1 is inactive, i.e. when it is not subject to any stress. The device 1 then comprises shock-absorbing means placed in this space, between the two reliefs 9, 16. The shock-absorbing means comprise at least one elastomer layer 18. The layer 18 has a thickness defined between a first surface 19, called inner surface, bonded to the irregular portion of the outer lateral surface 5 of the inner part 4, and a second surface 20, called outer surface, bonded to the irregular portion of the inner lateral surface 12 of the outer part 11. Preferably, but not necessarily, when the device 1 is inactive, the thickness of the elastomer layer 18 is constant, so that the behaviour of the device 1 is symmetrical regardless of the direction of the stresses applied. The elastomer layer 18 extends continuously about the axis of attachment A, i.e. it completely fills, through 360°, the space around the axis of attachment A between the inner lateral surface 12 of the inner part 11 and the outer lateral surface 5 of the inner part 4. Preferably, the space, and therefore the elastomer layer 18, are centered on the axis of attachment A.

By "bonded" is meant here the assembling the elastomer layer 18 onto the inner part 4 and onto the outer part 11 by any bonding mechanism, i.e. that close contact is formed on the one hand between the inner surface 19 of the elastomer layer 18 with the outer lateral surface 5 of the inner part 4, and on the other hand between the outer surface 20 of the elastomer layer 18 and the inner lateral surface 12 of the outer part 11, so that the surfaces 19, 20 of the elastomer layer 18 do not move relative to the inner part 4 and the outer part 11. Bonding can then be direct or can be carried out via another material, for example a glue.

By means of the reliefs 9, 16, regardless of the direction and orientation of the stresses caused by the vibrations, the elastomer layer 18 absorbs the vibrations, and the shock-absorption by the elastomer layer 18 can be adapted according to need.

In fact, due to the reliefs 9, 16, the elastomer layer 18 always comprises portions working under tension and portions working under compression in a complementary manner.

The operation of the shock-absorbing attachment device 1 will be explained with reference to the embodiments.

According to a first embodiment, shown in FIGS. 1 to 5a and 5b, the relief 9 of the inner part 4 is formed by a thread 21, the outer lateral surface thereof, by way of a male thread, describing at least 360° about the axis of attachment A. In a variant, the reliefs 9 can be formed by a plurality of threads 21. Thus, when viewed in a longitudinal cross-section in the plane P containing the axis of attachment A as shown in FIG. 1, the thread 21 forms, on the outer lateral surface of the inner part 4, irregularities in the form of a succession of hollows 22 and projections 23 in the direction of the axis of attachment A on both sides of the axis of attachment A.

Similarly, the relief 16 of the outer part 11 is formed by at least one thread 24 on its inner lateral surface 12, by way of a female thread, and describing at least 360° about the axis of attachment A. Thus, when viewed in a longitudinal cross-section in a plane P containing the axis of attachment A as shown in FIG. 1, the thread 24 forms irregularities on the inner lateral surface 12 of the outer part 11 in the form of a succession, in the direction of the axis of attachment A, of hollows 25 and projections 26 on both sides of the axis of attachment A.

According to a first example of the first embodiment, the threads 21, 24 are square or rectangular in shape, so that the transverse cross-section of the hollows 22, 25 and the projections 23, 26 is also square or rectangular. The elastomer layer 18 covers the threads 21, 24 so that the elastomer layer 18 comprises two segments 27, called transverse, the thickness of which is defined in the transverse direction. A first transverse segment 27 covers the crest of the thread 24 of the outer part 11, i.e. covers the base of the hollows 22 of the inner part 4 and the tip of the projections 26 of the outer part 11. The second transverse segment covers the crest of the thread 21 of the inner part 4, i.e. covers the end of the projections 23 of the inner part 4 and the base of the hollows 25 of the outer part 11. The elastomer layer 18 also comprises two segments 28, called longitudinal, the thickness of which is defined in the longitudinal direction, connecting the transverse segments 27 together, following the reliefs 9, 16.

When viewed in cross-section in a longitudinal plane P comprising the axis of attachment A, the elastomer layer 18 then comprises portions working longitudinally under tension and under compression against each another, and portions working under shear, regardless of the direction of the stresses applied between the inner part 4 and the outer part 11. More precisely, still when viewed in cross-section in a longitudinal plane P, the longitudinal segments 28 form, on each side of the axis of attachment A, successive longitudinal portions 28a, 28b, in the longitudinal direction with a determined pitch. Each transverse segment 27 comprises on one side of the axis of attachment A first transverse portions 27a offset from each other in crenels in the transverse direction and on the other side second transverse portions 27b, also offset from each other in crenels in the transverse direction.

Thus, when the device 1 is subject to stress in a longitudinal direction, the longitudinal segments 28 work longitudinally, under tension and under compression, and the transverse segments 27 work transversally under shear. More precisely, in this case, when viewed in a longitudinal plane P, if a longitudinal portion 28a of a first longitudinal segment 28 works under compression, then the following longitudinal portion 28b, of the second longitudinal segment 28, works under tension, and vice versa. Due to the reliefs 9, 16, there are always at least three longitudinal portions 28a, 28b, at least one of which works longitudinally against the other two. For example, if a first portion 28a of a first segment 28 works under tension, then the following portion 28b in the longitudinal direction, of the second longitudinal segment 28, works under compression and the third portion 28a, of the first longitudinal segment 28, works under tension. Preferably, the device comprises at least four longitudinal portions 28a, 28b, two portions 28a of a first longitudinal segment 28 working in a longitudinal direction and two portions 28b of the second longitudinal segment working in the other longitudinal direction. In this case, the transverse portions 27a, 27b work under shear.

When the device 1 is subject to stress in a transverse direction, the longitudinal segments 28 work under shear, and the transverse segments 27 work under tension and under compression. More precisely, considering a transverse plane P comprising the axis of attachment A, when the device 1 is subject to stress in a transverse direction, so that the transverse portions 27a on one side of the axis of attachment A work for example under tension, then the transverse portions 27b situated on the other side of the axis of attachment A work under compression, and vice versa.

According to a second example of the first embodiment, the threads 21, 24 are triangular in shape, so that the cross-section of the hollows 22, 25 and of the projections 23, 26 is also triangular. Thus, when viewed in longitudinal cross-section in a plane comprising the axis of attachment A, the hollows 22, 25 and the projections 23, 26 form a sawtooth pattern. The elastomer layer 18 covering the threads 21, 24 then has at least two segments 29 inclined with respect to each other in a longitudinal plane P, each segment 29 being oriented, according to its thickness, both according to a longitudinal component and according to a transverse component. More precisely, when the device is viewed in cross-section in a longitudinal plane P, a first segment 29 comprises portions 29a at a distance from each other in the longitudinal direction and, but not necessarily, parallel to each other, and the second segment 29 comprises portions 29b also at a distance from each other and, but not necessarily, parallel to each other, the portions 29a of the first segment 29 being inclined in relation to the portions 29b of the second segment 29, so as to define a sawtooth pattern on each side of the axis of attachment A.

When the device 1 is subject to stress in a longitudinal direction, a first segment 29 works longitudinally under tension and transversally under shear while the second segment 29 works longitudinally in the opposite direction i.e. under compression, and transversally under shear. More precisely, when the portions 29a of a first segment 29 work under tension, then the portions 29b of the second segment 29 work under compression, and vice versa. Just as above, due to the reliefs 9, 16 formed by the threads 21, 24, there are always at least three portions 29a, 29b working longitudinally, with at least one of the three portions which work longitudinally against the other two. For example, a first portion 29a of a first segment 29 works under tension, the second portion 29b in the longitudinal direction, of the second segment 29, works under compression, and the third portion 29a in the longitudinal direction, of the first segment 29, works under tension. Thus, by counterbalancing the work in one direction of two portions 29a by at least one portion 29b working in the opposite direction, the non-linear behaviours are reduced. Preferably, the device comprises at least four portions 29a, 29b, namely two portions of each segment 29, so as to always have two portions working under compression and two portions working under tension.

When the device 1 is subject to stress in a transverse direction, each inclined segment 29 works under shear and under tension or under compression. More precisely, considering a transverse plane P comprising the axis of attachment A, when under the effect of stress in the transverse direction, the portions 29a, 29b of the segments 29 situated on one side of the axis of attachment A work for example under tension, while the portions 29a, 29b on the other side of the axis of attachment A work under compression, and vice versa.

Thus, regardless of the direction of the stresses caused by the vibrations, the elastomer layer 18 still works at the same time under tension, under compression and under shear.

The shape of the threads 21, 24 can be any whatsoever. For example, the threads 21, 24 can be trapezoidal or rounded.

By simply altering the pitch of the threads 21, 24 and their number, it is possible to adjust the quantity of material of the elastomer layer 18, and thus to adjust the stiffness and the damping factor of the device 1. Adjusting the pitch of the threads 21, 24 also makes it possible to alter the dimension of the hollows 22, 25 and the projections 23, 26, so as to determine for which direction the vibrations will be preferentially absorbed or vice-versa, to a limited extent.

The first embodiment of the shock-absorbing attachment device 1 makes it possible in particular to hold the outer part 4 and the inner part 11 assembled together by screwing, as will be seen below, even in the event of rupture of the elastomer layer 18.

According to a second embodiment, the inner part 4 and the outer part 11 each comprise a plurality of reliefs 9, 16.

The reliefs 9 of the inner part 4 are formed by rings 30 that may, but do not necessarily, have rotational symmetry about the axis of attachment A, forming a projection on the lateral surface 5. Thus, the rings 30 form in themselves projections 31 and form hollows 32 between two successive rings 30 in the longitudinal direction. In a longitudinal plane comprising the axis of attachment A, the projections 31 and the hollows 32 are therefore symmetrical relative to the axis of attachment A.

Similarly, still according to the second embodiment, the reliefs 16 of the outer part 11 are formed by rings 33 that may, but do not necessarily, have rotational symmetry about the axis of attachment A, projecting on the inner lateral surface 12 of the outer part 11. The rings 33 form in themselves projections 34 on the inner lateral surface 12 of the outer part 11 and form hollows 35 between two successive adjacent rings 33 in the longitudinal direction.

According to the example shown, but not necessarily, the rings 30, 33 have a square or rectangular cross-section and extend perpendicularly to the longitudinal direction, i.e. they extend transversally on the outer surface 5 of the inner part 4 and the inner surface 12 of the outer part 11. Thus, the elastomer layer 18 extends between the projections 31, 34 and the hollows 32, 35 of the two parts 4, 11, so that when viewed in longitudinal cross-section in a plane comprising the axis of attachment A, the elastomer layer 18 forms crenels, on both sides of the axis of attachment A.

More precisely, the elastomer layer 18 comprises a plurality of transverse segments 37, the thickness of which is defined in a transverse direction, comprised between the end of a projection 31 of the inner part 4 and the base of a hollow 35 of the outer part 11 and between the end of a projection 34 of the outer part 11 and the base of a hollow 32 of the inner part 4. The elastomer layer 18 also comprises a plurality of longitudinal segments 38, the thickness of which is defined in the longitudinal direction, connecting the transverse segments 37 together in twos. Thus, each projection 31, 34 is covered by two longitudinal segments 38 and a transverse segment. When viewed in a longitudinal plane P comprising the axis of attachment A, the transverse segments 37 thus form, on one side of the axis of attachment A, transverse portions 37a, offset from each other in crenels in the transverse direction, and on the other side of the axis of attachment A, transverse portions 37b also offset from each other in crenels in the transverse direction. The longitudinal segments 38 themselves form longitudinal portions 38a, 38b at a distance from each other longitudinally with a determined pitch; on each projection 31, 34, two longitudinal portions 38a, 38b and a transverse portion 37a, 37b are bonded.

Thus, the behaviour of the elastomer layer 18 is substantially similar to that described in the first embodiment, with square or rectangular threads.

When the device 1 according to this second embodiment is subject to stress in a longitudinal direction, the transverse segments 37 work under shear and the longitudinal segments 38 work under tension and under compression. More precisely, when viewed in cross-section in a longitudinal plane P comprising the axis A, when a longitudinal portion 38a of a first longitudinal segment 38 works under compression, then the following longitudinal portion 38b in the longitudinal direction works under compression, and so on.

When the device 1 is subject to stress in a transverse direction, the transverse segments 37 work under tension and under compression, and the longitudinal segments 38 work under shear. More precisely, when viewed in cross-section in a longitudinal plane P comprising the axis A, when a portion 37a of a transverse segment 37, on a first side of the axis of attachment A, works under compression, the portion 37*b* of this same transverse segment 37 on the other side of the axis of attachment A works in tension, and vice versa.

Thus, just as before, regardless of the direction and the orientation of the stresses caused by the vibrations, the elastomer layer 18 still works at the same time under tension, under compression and under tension.

The shape of the rings 30, 33 is not necessarily square or rectangular, but can be triangular, trapezoidal or even rounded.

The stiffness and the damping factor of the device can thus be easily adjusted by adapting the number of rings 30,33 and the distance between them, so as to obtain transverse portions 37*a*, 37*b* and longitudinal portions 38*a*, 38*b* having the determined dimensional characteristics.

The shock-absorbing attachment device 1 thus formed is very adaptable, for a given space requirement.

In fact, the space requirement of the attachment device 1 is given by the outer dimensions of the outer part 11. It is not necessary to modify these dimensions in order to modify the characteristics of the device 1.

In particular, by dimensioning the reliefs 9, 16 i.e. the threads 21, 24 or the rings 30, 33, it is possible to obtain different performances for the device 1 depending on the desired applications. For example, as already described, it is possible to obtain on the elastomer layer 18 as much material working under tension and under compression at each moment by forming as many portions working under tension as portions working under compression at any moment. Such an arrangement makes it possible in particular to minimize the non-linear behaviours of the shock-absorption. It is also possible to promote absorption of the vibrations in the longitudinal direction or the transverse directions by adapting the dimension of the corresponding portions of the elastomer layer 18. By altering the pitch between the portions 28*a* and 28*b*, 29*a* and 29*b*, 38*a* and 38*b*, again, the stiffness can also be adapted.

Figure 4A:
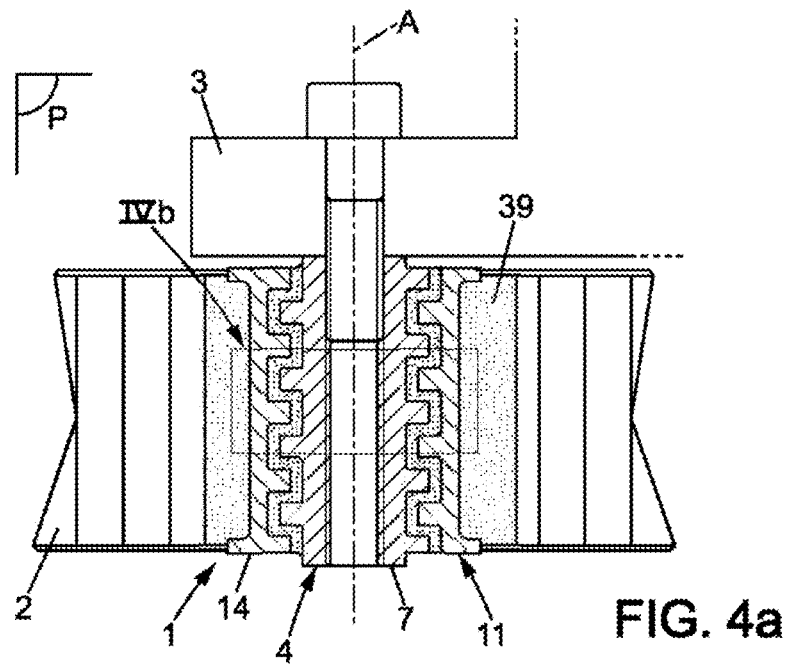
FIG. 4a is a longitudinal cross-section view similar to that of FIG. 1, a second element being assembled onto the first.
Figure 4B:
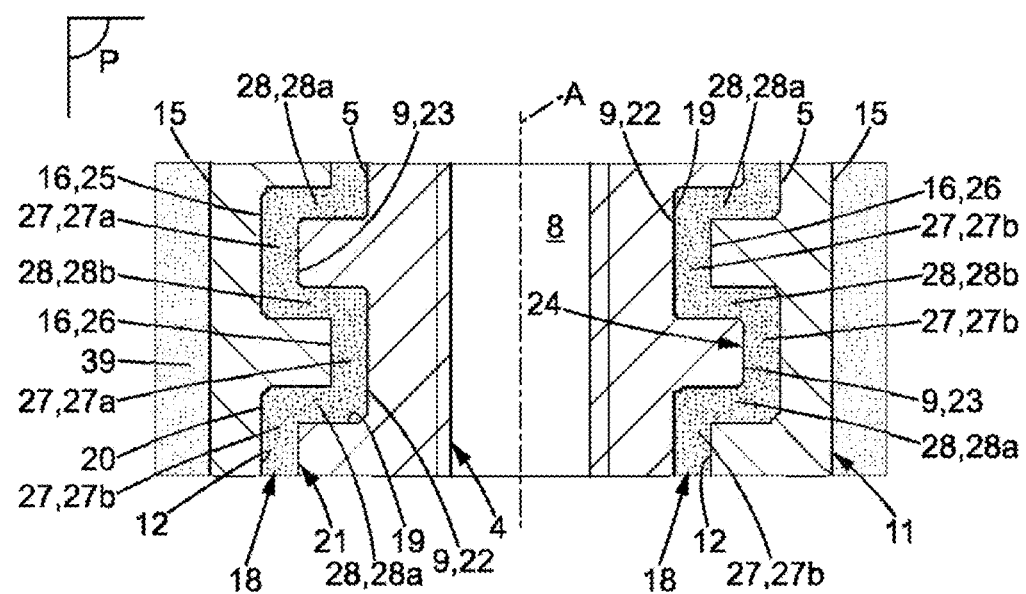
Figure 5A:
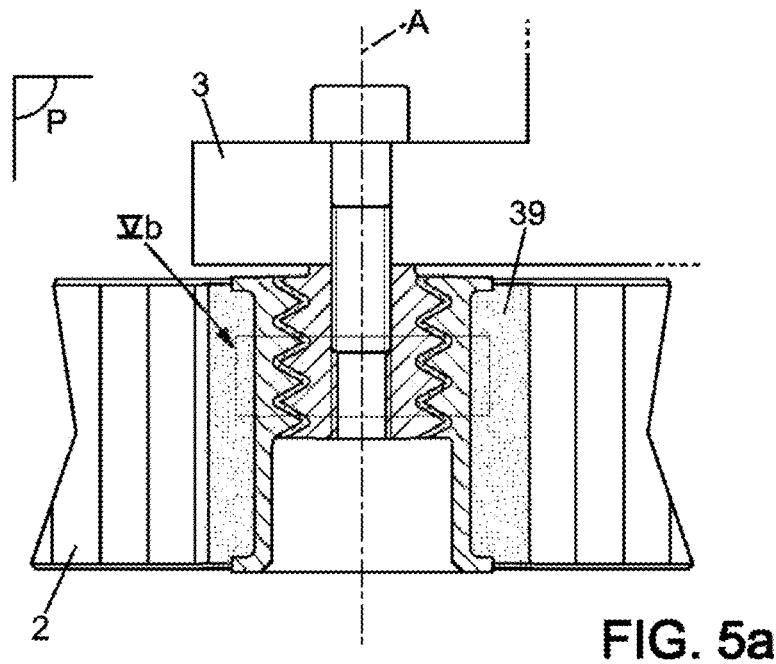
FIG. 5a is a view similar to that of FIG. 4a for a variant of the shock-absorbing attachment device according to the first embodiment.
Figure 5B:
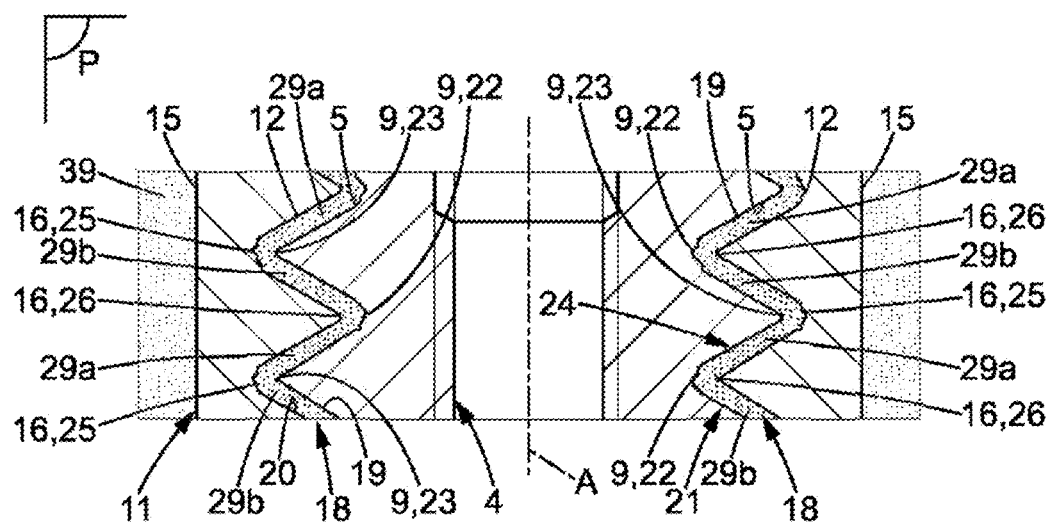
Figure 6A:
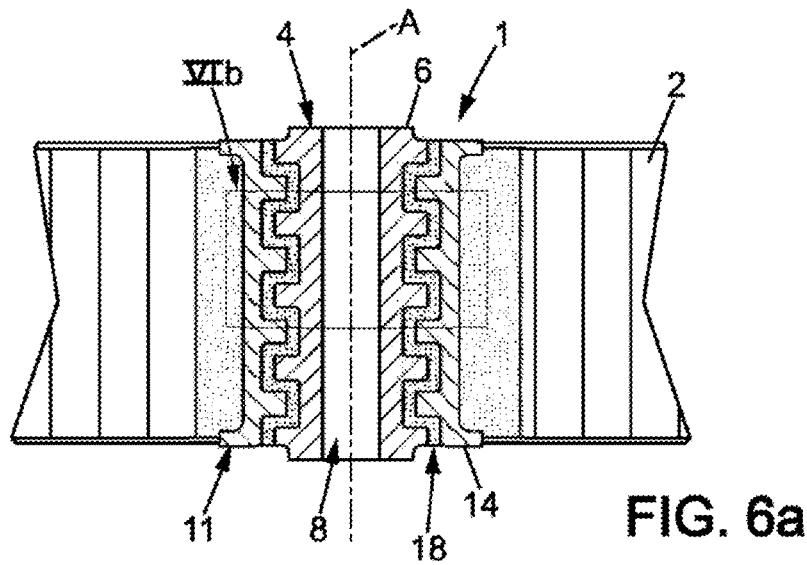
FIG. 6a is a longitudinal cross-section view of an inner part and an outer part of a shock-absorbing attachment device according to a second embodiment.
Figure 6B:
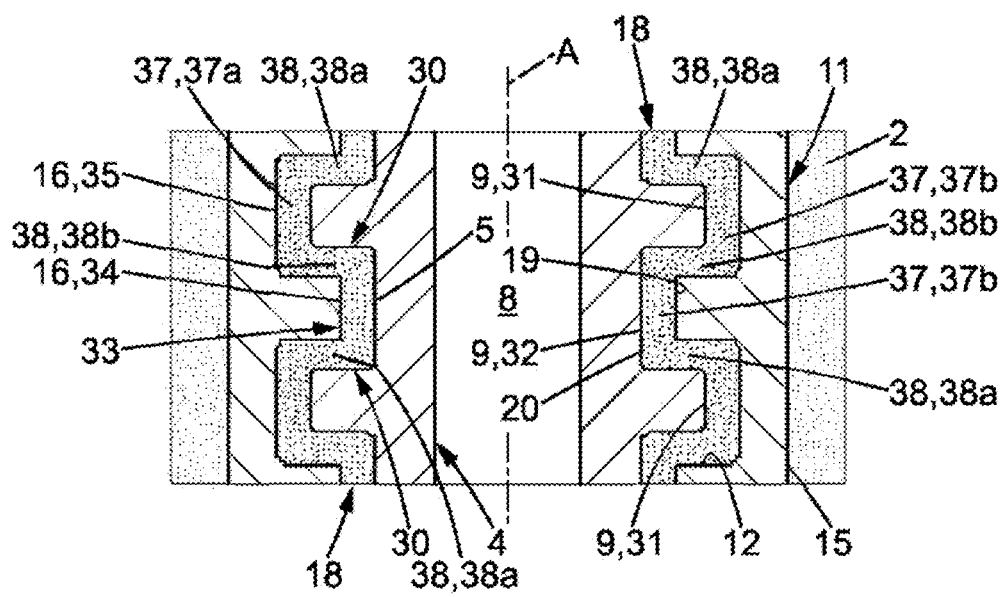

Furthermore, the longitudinal dimension of the inner part 4 can be substantially equal to that of the outer part 11, so that the whole of the outer lateral surface 12 of the outer part 11 is facing the outer lateral surface 5 of the inner part, as shown in FIGS. 1, 4*a* and 6*b*. However, it can be otherwise, and the longitudinal dimension of the inner part 4 can indeed be less than that of the outer part 11. Thus, in this way it is still possible to adapt the number of portions of the elastomer layer 18, and thereby the stiffness and the damping factor of the device 1.

It is also possible, still for the same space requirement, to modify the thickness of the elastomer layer 18 by modifying the outer diameter of the inner part 4 without modifying the outer dimensions of the device 1.

Preferably, but not necessarily, only the outer lateral surface 5 of the inner part 4 and the inner lateral surface 12 of the inner part 11 serve as a support for the elastomer layer 18 and participate in shock-absorption, i.e. their upper surfaces 6, 13 and lower surfaces 7, 14 lack elastomer elements. Now, the stiffness of the device 1 is substantially proportional to the total surface area bonded to the elastomer layer 18. By dimensioning the reliefs 9, 16, the inner part 4 and the outer part 11, it is then possible to obtain the desired stiffness.

Thus, by locating the elastomer layer 18 between the outer lateral surface 5 of the inner part 4 and the inner lateral surface 12 of the outer part 11, the modifications made to the reliefs 9, 16 make it possible to easily modify the characteristics of the elastomer layer 18 for a given space requirement of the device 1, without revising the outer dimensions of the device 1.

The device 1 is mounted between the panel 2 and the item of equipment 3 in the following manner.

The device 1, comprising the inner part 4, the outer part 11 and the elastomer layer 18 rigidly connecting the two parts 4, 11 is placed in an opening on the panel 2 provided for this purpose. The outer lateral surface 15 of the outer part 11 is thus rigidly attached on the panel 2, in the opening provided. For example, the diameter of the opening in the panel is greater than the outer diameter of the inner part 11. The space between the outer lateral surface 15 and the surface of the opening in the panel 2 is filled with a substance 39 of a glue type, ensuring rigid attachment. The device 1 is then fitted in the panel 2. The item of equipment 3 is then rigidly attached on the inner part 4. For example, the item of equipment 3 comprises a leg 40 which is supported on the upper surface 6 of the inner part 4. The leg 40 comprises a hole, which is placed coaxially with the hole 8 in the inner part 4. An attachment means of the screw type 41 is then inserted in the hole of the leg 40 and the hole 8 of the inner part 4, in order to cooperate with the female thread of the hole 8 of the inner part 4. The item of equipment 3 is then rigidly attached on the inner part 4.

The device 1 thus makes it possible to ensure the rigid attachment of the panel 2 and the item of equipment 3 while offering absorption of the vibrations of the panel 2 towards the item of equipment 3, or vice-versa, by the elastomer layer 18.

Figure 7:
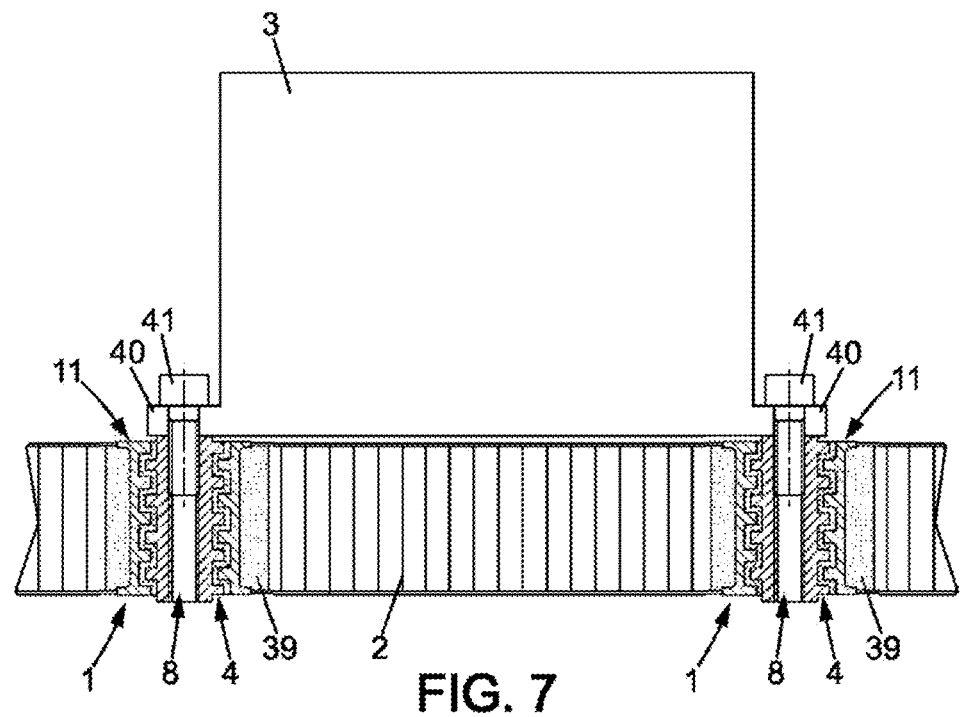
FIG. 7 is a first example of a set comprising two assembled elements.

In practice, a plurality of devices 1 is used in order to ensure attachment between the panel 2 and the item of equipment 3. For example, the devices 1 are distributed at the periphery of the item of equipment 3 and are placed in parallel to each other i.e. their axes of attachment A are parallel, as shown in FIG. 7.

Figure 8:
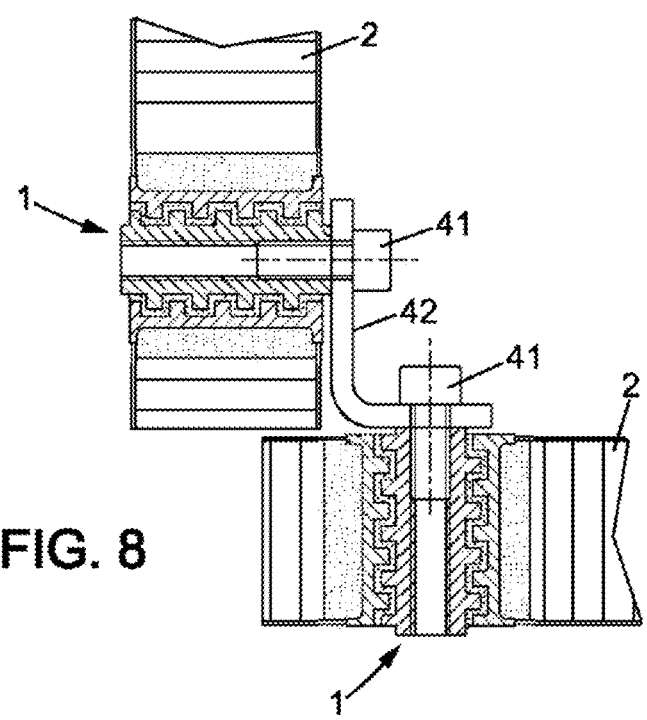
FIG. 8 is a second example of an assembly comprising two assembled elements.
Figure 9A:
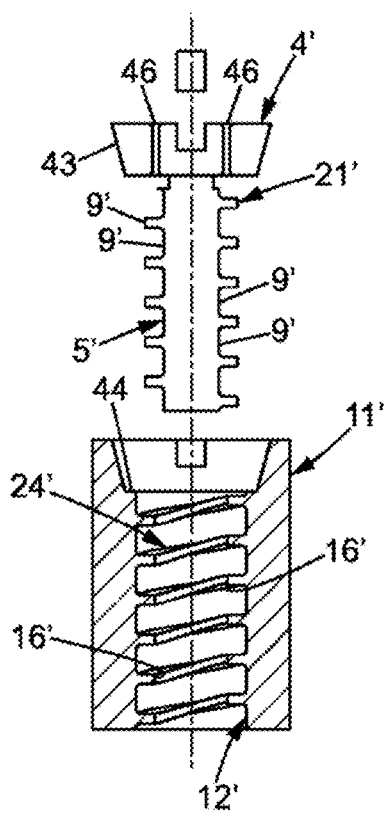
Figure 9B:
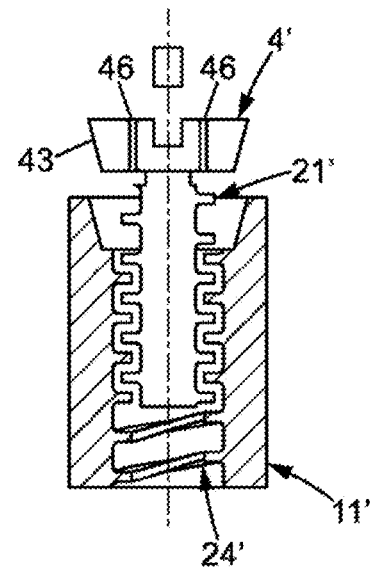
Figure 9C:
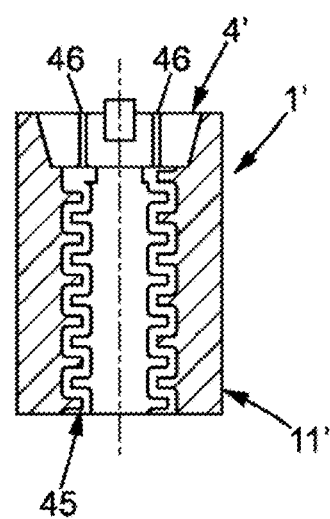
Figure 9D:
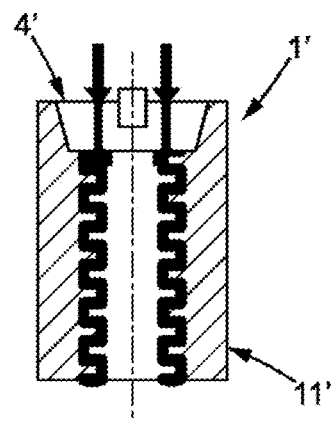
Figure 9E:
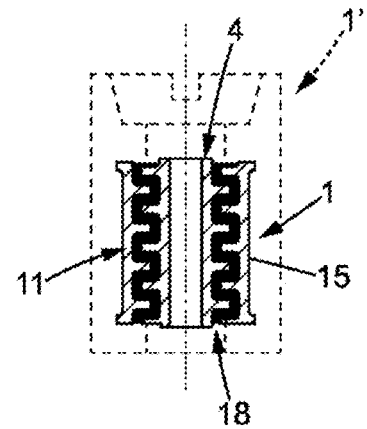
Figure 10A:
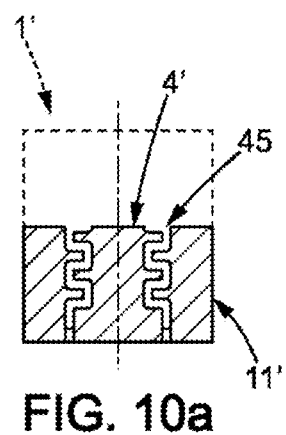
Figure 10B:
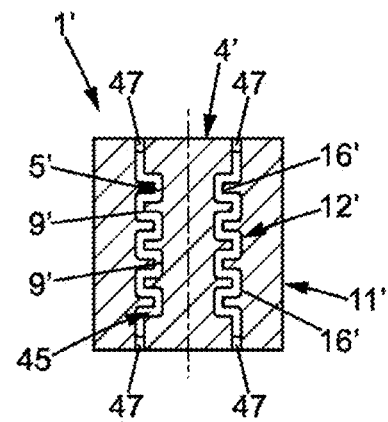
Figure 10C:
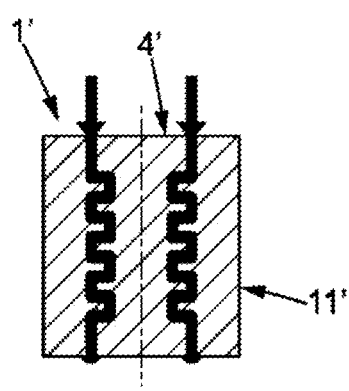
Figure 10D:
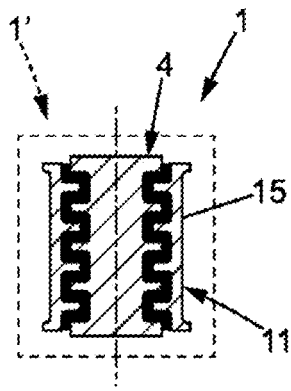

In a variant, the devices 1 can be placed so as to form an angle between them, i.e. their axes of attachment A are not parallel. For example, in FIG. 8, two devices 1 are placed at 90° in order to make it possible to rigidly assemble two elements of the panel 2 type by means of an intermediate plate 42.

In yet another variant, the device 1 can be used in order to assemble interface rings of a launcher and a satellite. For example, the first element 2 is a launcher interface ring, mounted on a satellite body, and the second element 3 is a satellite interface ring, mounted on a launcher.

A method for producing the shock-absorbing attachment device 1 will now be described. As already indicated, the inner part 4 and the outer part 11 are preferably made from metal. One of the difficulties in the method for producing the device 1 is ensuring that the relative position of the inner part 4 with respect to the outer part 11 is held in such a manner that the space between them respects the desired dimensions of the elastomer layer 18.

According to a first embodiment of the method of production (FIGS. 9*a* to 9*e*), the inner part 4 and the outer part 11 are first each machined from a blank. In particular, a first blank 4', intended to form the inner part 4, has an outer lateral surface 5' which is machined so as to have reliefs 9'; a second blank 11', intended to form the outer part 11, has an inner lateral surface 12' which is machined so as to have reliefs 16' complementary to those 9' of the first blank 4'. This first embodiment of the method of production is particularly suitable for the device 1 described with reference to the first embodiment, in which the reliefs 9, 16 are formed by threads 21, 24. Thus, the lateral surface 5' of the first blank is threaded in order to form a thread 21' and the inner lateral surface 12' of the second blank 11' is tapped in order to form a complementary thread 24'.

Advantageously, means are provided for assembling and centering the first blank 4' with the second blank 11' along the axis of attachment A. For example, the first blank 4' comprises at one end a conical head 43, and the second blank 11' comprises at one end a shoulder forming a conical seat 44, complementary to the head 43.

The first blank 4' can then be screwed in the second blank 11' due to their complementary threads 21', 24', until the head 43 is accommodated in the seat 44 with minimal, or even non-existent, clearance, ensuring the relative position between the two blanks 4', 11' in which a space 45 is formed between them.

Thus, a blank 1' is obtained, the dimensions of which are greater than those of the final device 1.

An elastomer can then be injected in the space 45. For example, the head 43 of the first blank 4' comprises openings 46 forming channels for the injection under pressure of the elastomer, in order to form the elastomer layer 18. The elastomer then fills the space 45. A stage of bonding the elastomer on the inner wall 5' of the first blank 4' and on the inner lateral wall 12' of the second blank 11' is provided. Bonding is obtained by heating the set, for example. The elastomer is thus rigidly attached to the blanks 4', 11'.

In a variant, before screwing the first blank 4' in the second blank 11', the thread 21' of the first blank is covered with an elastomer tube, which bonds to the outer lateral wall 5'. Then, the first blank 4' thus covered is forcefully screwed into the second blank 11'. An additional stage of bonding makes it possible for the elastomer tube to bond to the inner lateral wall 12' of the first blank.

Finally, the blank 1' of the device 1 is machined so as to obtain the desired final dimensions of the device 1 for the upper surfaces 6, 13, the lower surfaces 7, 14 and the outer lateral surface 15 of the outer part 11. In particular, the head 43 and the seat 44 are removed.

According to a second embodiment of the method of production (FIGS. 10a to 10d), a first blank 4' of the inner part 4 is produced simultaneously with a second blank 5' of the inner part 5, in one and the same stage, during which the relative position between the two blanks respects the desired final relative position between the inner part 4 and the outer part 5.

Thus, according to a first example, the blank 1' of the device comprising the first blank 4' and the second blank 11' is produced by three-dimensional printing, and more particularly by the so-called "ALM" ("Additive Layer Manufacturing") technique. The first blank 4' and the second blank 11' are then obtained simultaneously. As before, the first blank 4' has on the outer surface 5' reliefs 9' complementary to reliefs 16' on the inner surface 12' of the second blank 11'. Bridges 47 of material are formed on the complete blank 1' at the two ends between the two blanks 4', 11' so as to hold their relative position, a space 45 being formed between them.

In a variant, the two blanks 4', 11' forming the complete blank 1' and the bridges 47 can be obtained by casting.

The elastomer is injected between the bridges 47 in the space 45 between the two blanks 4', 11' so as to cover their reliefs 9', 16' and to bond to the outer surface 5' of the first blank 4' and the inner surface 12' of the second blank 11'.

The blank 1' of device 1 has dimensions greater than those of the final device 1, so that, similarly to above, the blank 1' is machined in order to obtain the desired final dimensions of the device 1, the bridges 47 then being removed.

The fact that the first blank 4' and the second blank 11' are not to the final dimensions of the inner part 4 and of the outer part 11 makes it possible to inject the elastomer under pressure in the space 45 between the blanks 4', 11', while avoiding the risk of rupture of the materials. In particular, the thickness of the outer part 11, i.e. the dimension between its inner surface 12 and its outer surface 15, may need to be small in order to respect the dimensioning of the elastomer layer 18 and the reliefs 9, 16, while respecting a maximum space requirement. By forming the second blank 11' with greater thickness, the risks of rupture at the moment of the injection under pressure are reduced.

Furthermore, by injecting the elastomer under pressure, it is possible to retain this pressure within the elastomer layer 18. This latter is then under compression between the inner part 4 and the outer part 11. By adapting this pressure within the elastomer layer 18, it is possible to obtain a device 1 the stiffness of which is greater than that of the known inserts. In fact, the greater the pressure, the less the elastomer layer 18 can stretch, increasing the stiffness of the device 1.

However, it can be envisaged to directly produce blanks 4', 11' to the final dimensions of the inner part 4 and the outer part 11, linked together by bridges 47 of material as above, between on the one hand the upper surface 6 of the inner part 4 and the upper surface 13 of the outer part 11 and on the other hand between the lower surface 7 of the inner part 4 and the lower surface 14 of the outer part 11 (FIGS. 11a and 11b). In this case, once the elastomer is injected and bonded in order to form the elastomer layer 18, the bridges 47 are broken.

The device 1 can then be assembled between the two elements 2, 3 of the satellite as previously described. The device 1 is then a single piece to be handled for the assembly of the two elements 2, 3, making for easier assembly. The number of parts to be stored is also reduced, making it easier to manage and therefore less costly.

The device 1 thus formed also allows great adaptability while retaining a given space requirement by dimensioning on the one hand the space 45 between the blanks 4' 11' and on the other hand the reliefs 9, 16 according to the desired performances.

The invention claimed is:

1. Device (1) for the shock-absorbing attachment of two elements (2, 3) to be assembled, the attachment device comprising:
    an inner part (4) that is tubular along an axis of attachment (A) intended to be rigidly attached to an element (3) to be assembled, and comprising an outer lateral surface (5);
    an outer part (11) that is tubular along the axis of attachment (A), and is hollow, intended to be rigidly attached to another element (2) to be assembled and comprising an inner lateral surface (12), the inner part (4) being accommodated in the outer part (3) so that the outer surface of the inner part is facing the inner surface of the outer part;
    an elastomer layer (18) between the outer part (11) and the inner part (4),
    wherein the outer lateral surface (5) of the inner part (4) comprises at least one irregular portion and the inner lateral surface (12) of the outer part (11) comprises at least one irregular portion complementary to the irregular portion of the outer surface (5) of the inner part (4), the elastomer layer (18) comprising a first face (19) bonded to the irregular portion of the lateral outer surface (5) of the inner part (4), and a second face (20) opposite to the first face (19), bonded to the irregular portion of the lateral inner surface (12) of the outer part (11), wherein the irregular portion of the inner part (4) and the irregular portion of the outer part (5) overlap one another radially of the axis of attachment (A) and wherein the elastomer layer (18), when viewed in cross-section in a longitudinal plane (P) comprising the axis of attachment (A), comprises:

at least two portions (27a, 27b, 37a, 37b, 29a, 29b), called transverse, working in a direction that is transverse to the axis of attachment (A), a first portion (27a, 29a, 37a) being situated on a first side of the axis of attachment (A) and the second portion (27b, 29b, 37b) being situated on the other side of the axis of attachment (A), and wherein the elastomer layer, when viewed in cross-section in a longitudinal plane comprising the axis of attachment, comprises on each side of the axis of attachment, at least three portions, called longitudinal, distributed in the direction of the axis of attachment with a predetermined pitch, at least one of the three longitudinal portions working against the other two portions in the direction of the axis of attachment.

2. Device (1) according to claim 1, in which the irregular portion of the outer surface (5) of the inner part (4) and the irregular portion of the inner surface (12) of the outer part (11) comprise rings (30, 33) around the longitudinal direction.

3. Device (1) according to claim 2, in which the rings (30, 33) are substantially perpendicular to the longitudinal direction and rectangular in shape.

4. Device (1) according to claim 1, in which the irregular portion of the outer surface (5) of the inner part (4) comprises at least one thread (21) around the longitudinal direction, and in which the irregular portion of the inner surface (12) of the outer part (11) comprises at least one thread (24) complementary to the thread (21) of the inner part (4), the elastomer layer (18) at least partially covering the threads (21, 24).

5. Device (1) according to claim 4, in which the threads (21, 24) are rectangular.

6. Device (1) according to claim 4, in which the threads (21, 24) are triangular.

7. Device (1) according to claim 1, in which the inner part (4) and the outer part (11) are metal parts.

8. Device (1) according to claim 1, in which, when the device is inactive, the thickness of the elastomer layer (18), between its two faces (19, 20), is constant.

9. Device (1) according to claim 1, in which the elastomer layer (18) is continuous in the longitudinal direction and around the longitudinal direction, so that the elastomer layer (18) has the form of a single one-piece part made from elastomer.

10. Device (1) according to claim 1, in which the inner part (4) comprises a hole (8).

11. Method for producing a shock-absorbing attachment device according to claim 1, comprising the following stages:

producing a blank (1') of the device comprising a blank (4') of the inner part (4) on which an outer surface (5') is formed and a blank (11') of the outer part (11) on which an inner surface (12') is formed, the inner surface (11') of the blank of the outer part (11) facing the outer surface (5') of the blank (4') of the inner part (4);

inserting an elastomer between the outer surface (5') of the blank (4') of the inner part (4) and the inner surface (12') of the blank (11') of the outer part (11);

bonding the elastomer both on the outer surface (5') of the blank (4') of the inner part (4), as well as on the inner surface (12') of the blank (11') of the outer part (11).

12. Method of production according to claim 11, in which the stage of inserting the elastomer is an injection stage.

13. Method of production according to claim 11, in which the production of the blank (1') of the device (1) comprises the following operations:

machining the blank (4') of the inner part (4), the outer surface (5') forming a male thread, machining the blank (11') of the outer part (11) the inner surface (12') forming a female thread complementary to the male thread, screwing the blank (4') of the inner part (4) into the blank (11') of the outer part (11) in order to obtain the blank (1') of the device (1).

14. Method of production according to claim 13, in which the production of the blank (1') of the device (1) comprises the following operations:

simultaneous three-dimensional printing of the blank (11') of the outer part (11) and the blank (4') of the inner part (4) in position in the blank (11') of the outer part (11), producing at least one bridge (47) between the blank (11') of the outer part (11) and the blank (4') of the inner part (4) ensuring their relative position is held.

15. Method of production according to claim 11, comprising a final stage of machining the blank (1') to the desired final dimensions of the device (1).

16. Set comprising at least two elements assembled by means of at least one device (1) according to claim 1, the outer part (11) being rigidly attached to a first element (2), the inner part (4) being rigidly attached to the second element (3).

17. Set according to claim 16, in which the inner part (4) comprises a hole (8), the second element (3) being rigidly attached to the inner part (4) via a screw passing through the hole (8).

18. Set according to claim 17, in which the first element (2) is a launcher interface ring and the second element (3) is a satellite interface ring.

19. Set according to claim 16, in which the first element (2) is a load-bearing structure, such as the body of a satellite and the second element (3) is an item of equipment of the satellite.

20. Method of assembling a support set according to claim 16, comprising a stage of rigidly attaching the outer part (11) of the attachment device (1) to the first element (2) and a stage of rigidly attaching the second element (3) to the inner part (4) of the attachment device (1).

* * * * *